United States Patent
Hasunuma et al.

(10) Patent No.: US 6,862,164 B2
(45) Date of Patent: Mar. 1, 2005

(54) CIRCUIT PROTECTION ARRANGEMENT

(75) Inventors: Takashi Hasunuma, Narita (JP);
Naofumi Miyasaka, Chiba (JP);
Masatoshi Sakamoto, Narita (JP);
Takashi Sato, Chiba (JP)

(73) Assignee: Tyco Electronics Raychem K.K., Kanagawa (JP)

( * ) Notice: Subject to any disclaimer, the term of this patent is extended or adjusted under 35 U.S.C. 154(b) by 382 days.

(21) Appl. No.: 10/140,966

(22) Filed: May 7, 2002

(65) Prior Publication Data

US 2002/0181182 A1 Dec. 5, 2002

Related U.S. Application Data

(60) Provisional application No. 60/289,676, filed on May 8, 2001.

(51) Int. Cl.[7] .............................. H02H 9/00; H01H 7/00
(52) U.S. Cl. ........................ 361/106; 338/48; 338/22 R
(58) Field of Search ................................. 361/103, 106, 361/54, 56, 55, 91, 111; 338/17, 320, 20–23, 48, 49; 320/134, 136

(56) References Cited

U.S. PATENT DOCUMENTS

| | | | |
|---|---|---|---|
| 3,644,864 A | * 2/1972 | Hirsbrunner et al. ......... 338/25 |
| 3,916,264 A | 10/1975 | Berg ............................ 317/41 |
| 4,237,441 A | 12/1980 | van Konynenburg et al. . 338/22 R |
| 4,475,138 A | * 10/1984 | Middleman et al. .......... 361/58 |
| 4,545,926 A | 10/1985 | Fouts, Jr. et al. ........... 252/511 |
| 4,689,475 A | 8/1987 | Kleiner et al. .............. 219/553 |
| 4,774,024 A | 9/1988 | Deep et al. ................. 252/511 |
| 4,800,253 A | 1/1989 | Kleiner et al. .............. 219/553 |
| 4,935,156 A | 6/1990 | van Konynenburg et al. .......... 219/553 |
| 5,049,850 A | 9/1991 | Evans ....................... 338/22 R |
| 5,296,996 A | * 3/1994 | Hansson et al. ............... 361/24 |
| 5,378,407 A | 1/1995 | Chandler et al. ............ 252/513 |

(List continued on next page.)

FOREIGN PATENT DOCUMENTS

| | | | |
|---|---|---|---|
| EP | 0 304 196 A | 2/1989 | |
| EP | 0 346 262 A | 12/1989 | |
| JP | 04075418 A | * 3/1992 | .......... H02H/09/02 |
| WO | WO 99/53505 | 10/1999 | |
| WO | WO 99/60637 | 11/1999 | |

OTHER PUBLICATIONS

International Search Report for International Application No. PCTUS02/14413 dated Nov. 29, 2002.
Patent Abstracts of Japan, vol. 1997, No. 01, Jan. 31, 1997 & Japanese Publication No. JP 08–250304 A (Nichicon Corp.), Sep. 27, 1996 (abstract only).

*Primary Examiner*—Jonathan Salata

(57) ABSTRACT

A circuit protection arrangement particularly useful in protecting battery assemblies. The arrangement contains a first PTC device which has a first switching temperature $T_{s1}$, has a resistance at 20° C. $R_1$, has a hold current at a first specified temperature $I_{H1}$, and is made from a first PTC resistive element composed of a first conductive polymer composition attached to first and second electrodes, and a second PTC device which is electrically connected in series with the first PTC device, has a second switching temperature $T_{s2}$ which is less than $T_{s1}$, has a resistance at 20° C. $R_2$ which is less than $R_1$, has a hold current at the first specified temperature $I_{H2}$ which is greater than $I_{H1}$, and is made from a second PTC resistive element composed of a second conductive polymer composition attached to third and fourth electrodes. $I_{H1}$ equals $I_{H2}$ at a critical temperature $T_{crit}$, such that at temperatures below $T_{crit}$, the first PTC device switches into a high resistance state and the circuit protection arrangement is resettable, and at temperatures greater than $T_{crit}$, the second PTC device switches into a high resistance state and initiates an action causing the circuit protection arrangement to permanently open.

13 Claims, 1 Drawing Sheet

U.S. PATENT DOCUMENTS

| | | | |
|---|---|---|---|
| 5,379,138 A | * 1/1995 | Okada | 349/173 |
| 5,451,919 A | 9/1995 | Chu et al. | 338/22 R |
| 5,582,770 A | 12/1996 | Chu et al. | 252/511 |
| 6,570,483 B1 | 3/1997 | Chandler et al. | |
| 5,644,461 A | * 7/1997 | Miller et al. | 361/56 |
| 5,708,553 A | 1/1998 | Hung | 361/103 |
| 5,747,147 A | 5/1998 | Wartenberg et al. | 428/209 |
| 5,801,612 A | 9/1998 | Chandler et al. | 338/22 R |
| 6,130,597 A | 10/2000 | Toth et al. | 338/22 R |
| 6,342,994 B1 | * 1/2002 | Cousy et al. | 361/24 |
| 6,358,438 B1 | 3/2002 | Isozaki et al. | 252/511 |
| 6,362,721 B1 | 3/2002 | Chen et al. | 338/22 R |
| 6,556,403 B1 | * 4/2003 | Furuta et al. | 361/93.1 |
| 6,661,633 B1 | * 12/2003 | Furuta et al. | 361/103 |
| 2003/0132732 A1 | * 7/2003 | Thomas et al. | 320/134 |

* cited by examiner

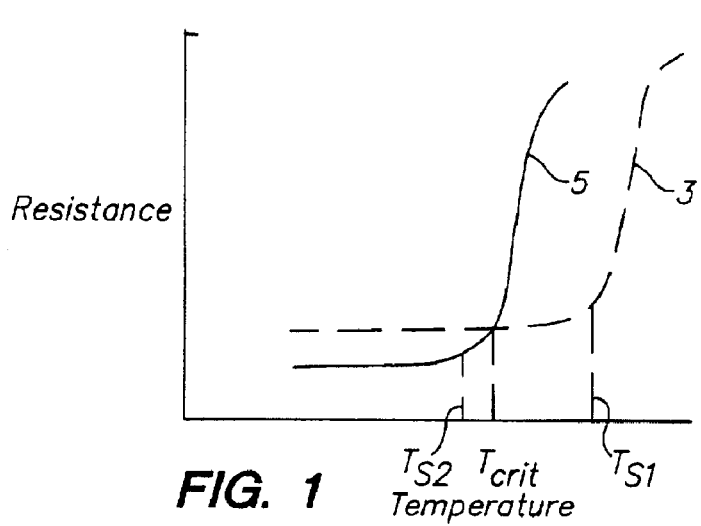 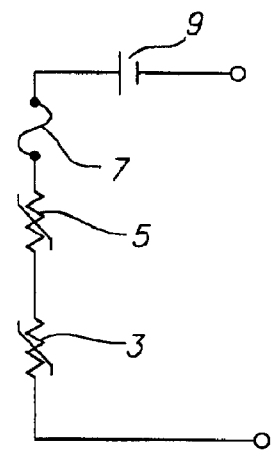
FIG. 1
FIG. 3
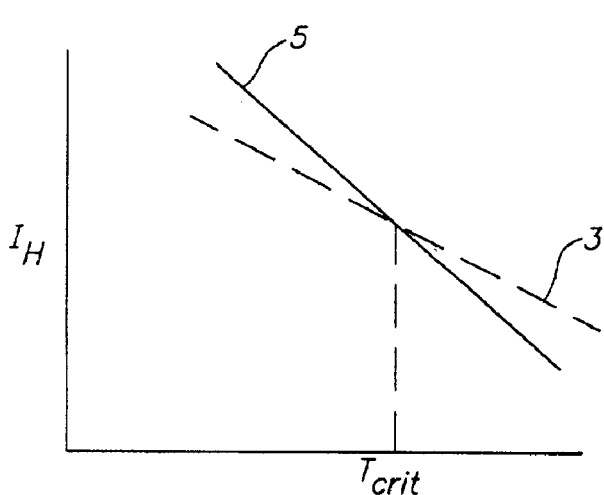 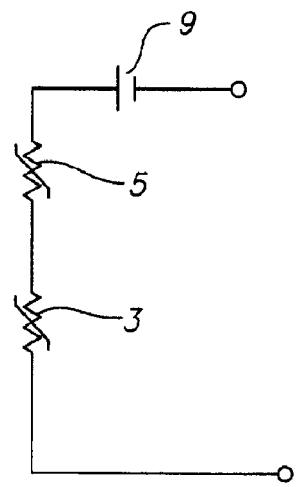
FIG. 2
FIG. 5
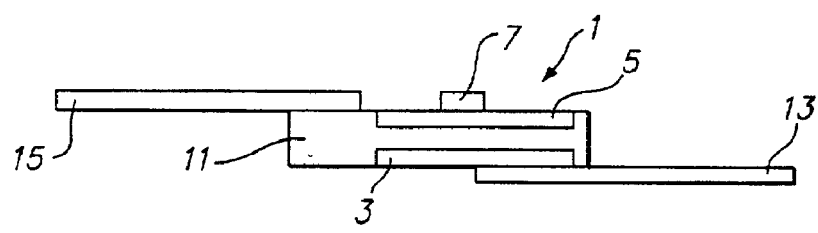
FIG. 4
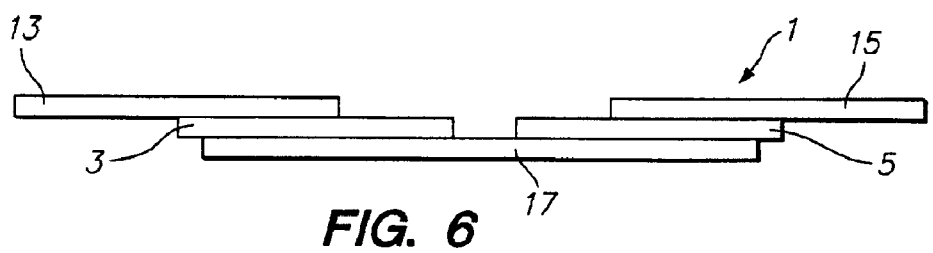
FIG. 6

CIRCUIT PROTECTION ARRANGEMENT

CROSS-REFERENCE TO RELATED APPLICATIONS

This application is an application under 35 USC 111(a) and claims priority under 35 USC 119 from Provisional Application Ser. No. 60/289,676, filed May 8, 2001 under 35 USC 111(b). The disclosure of that provisional application is incorporated herein by reference.

BACKGROUND OF THE INVENTION

1. Field of the Invention

This invention relates to a circuit protection arrangement comprising conductive polymer devices, and to circuits and assemblies comprising such an arrangement.

2. Introduction to the Invention

Electrical devices exhibiting a positive temperature coefficient of resistance (PTC behavior) are well-known for use as circuit protection devices. Such devices generally comprise a PTC element composed of a conductive polymer composition in which a particulate conductive filler is dispersed in a crystalline polymeric component. First and second electrodes, e.g. in the form of metal sheets, are attached to the conductive polymer to allow electrical connection to the device in the circuit. During normal operation the PTC device is in a low resistance, low temperature condition. When a very high current condition occurs, for example, due to a short circuit or an overvoltage condition, or a very high temperature condition occurs, for example, during excessive charging in a battery application, the device "switches" or "trips" into a high resistance, high temperature condition, thus decreasing the current through the circuit to a low level and protecting the electrical components in the circuit.

The temperature at which this transition from low resistance to high resistance occurs is the switching temperature, $T_s$. $T_s$ is defined as the temperature at the intersection point of extensions of the substantially straight portions of a plot of the log of the resistance of the PTC element as a function of the temperature which lie on either side of the portion of the curve showing a sharp change in slope. The switching temperature is a function of the type of conductive polymer composition used in the device. In general, $T_s$ is slightly lower than the melting temperature $T_m$ of the polymeric component, where $T_m$ is defined as the peak of the endotherm of a differential scanning calorimeter. When there is more than one peak, $T_m$ is defined as the temperature of the peak having the greatest volume, i.e. the majority component in the composition. Therefore, depending on the application and the anticipated thermal environment, a PTC device based on a particular composition having a particular $T_s$ is selected.

PTC devices are rated based on their ability to withstand a particular combination of voltage and current without failing. Thus a PTC device has a hold current, $I_H$, which is the largest steady-state current that, under specified ambient conditions, can be passed through a device without causing the device to trip into a high resistance state; a trip current, $I_T$, which is the smallest steady state current that, if passed through the device, will cause the device to trip; and a maximum interrupt current, $I_{max}$, which is the highest fault current that can be safely used to trip a device under specified conditions. The hold and trip currents are a function of temperature, decreasing with increasing temperature.

BRIEF SUMMARY OF THE NVENTION

Battery packs, in which a plurality of batteries, i.e. cells, are present, are commonly used with electrical equipment such as cameras, video recorders, tools, portable computers, personal data assistants (PDAs) and cellular phones. It is desirable to make the battery packs as small and lightweight as possible, but still provide adequate protection in the event of a short circuit, a runaway charge fault, charging at the wrong voltage, and/or reverse charging. PTC devices are commonly used in series with the cells of the pack, and preferably have a low resistance and a low switching temperature, e.g. less than 100° C., and preferably less than 90° C., so that batteries with relatively long discharge times, e.g., nickel-metal hydride batteries and lithium-ion batteries, which are sensitive to overtemperature conditions switch at a temperature low enough to prevent damage to the battery itself or the case surrounding it.

We have now found that two PTC devices having different characteristics, such as switching temperatures or hold currents, can be used to prepare a circuit protection arrangement, e.g. a composite electrical device, which is resettable under a first set of conditions, but is not resettable under a second set of conditions. As a result, the circuit protection arrangement can be used repeatedly under normal operating conditions, but, if exposed to an extreme, e.g. a very high overcurrent or overtemperature, the arrangement will go to a very high resistance state and will "open" in a safe and reliable manner. Such circuit protection arrangements are particularly suitable for use in battery assemblies for which there are certain circumstances, e.g. exposure to very high temperatures, after which it is preferable to permanently disable the battery pack to prevent continued use.

In a first aspect this invention provides a circuit protection arrangement which comprises (1) a first PTC device which (i) has a first switching temperature $T_{s1}$, (ii) has a resistance at 20° C. $R_1$, (iii) has a hold current at a first specified temperature $I_{H1}$, and (iv) comprises
   (a) a first PTC resistive element composed of a first conductive polymer composition comprising a polymeric component, and, dispersed therein, a particulate conductive filler, and
   (b) first and second electrodes which are attached to the first PTC element; and (2) a second PTC device which (i) is electrically connected in series with the first PTC device, (ii) has a second switching temperature $T_{s2}$ which is less than $T_{s1}$, (iii) has a resistance at 20° C. $R_2$ which is less than $R_1$, (iv) has a hold current at the first specified temperature $I_{H2}$ which is greater than $I_{H1}$, and (v) comprises
   (a) a second PTC resistive element composed of a second conductive polymer composition comprising a polymeric component, and, dispersed therein, a particulate conductive filler, and
   (b) third and fourth electrodes which are attached to the second PTC element;

$I_{H1}$ equaling $I_{H2}$ at a critical temperature $T_{crit}$, which is greater than the first specified temperature such that (A) at temperatures below $T_{crit}$, the first PTC device switches into a high resistance state and the circuit protection arrangement is resettable, and (B) at temperatures greater than $T_{crit}$, the second PTC device switches into a high resistance state and initiates an action causing the circuit protection arrangement to permanently open.

The circuit protection arrangements of the first aspect of the invention are particularly useful in battery assemblies.

Therefore, in a second aspect, the invention provides a battery assembly which comprises (I) a battery; and (II) a circuit protection arrangement of the first aspect of the invention wherein the first and second PTC devices are in electrical contact with the battery.

BRIEF DESCRIPTION OF THE DRAWINGS

The invention is illustrated by the drawings in which

FIG. 1 is a graphical representation of resistance as a function of temperature for the first and second PTC devices used in the circuit protection arrangement of the invention;

FIG. 2 is a graphical representation of hold current as a function of temperature for the first and second PTC devices used in the circuit protection arrangement of the invention;

FIG. 3 is a circuit diagram for a circuit protection arrangement of the invention;

FIG. 4 is a schematic view of the arrangement of FIG. 3;

FIG. 5 is a circuit diagram for a circuit protection arrangement of the invention; and FIG. 6 is a schematic view of the arrangement of FIG. 5.

DETAILED DESCRIPTION OF THE INVENTION

The circuit protection arrangement of the invention comprises first and second PTC devices which are electrically in series with, but preferably thermally separated from, each other. It is preferred that the first and second PTC devices have the same general configuration, although depending on the application and the space available for installation, they may be different. Generally both the first and second PTC devices comprise a PTC resistive element which is composed of a conductive polymer composition. Such compositions comprise a polymeric component, and dispersed therein, a particulate conductive filler such as carbon black or metal. Conductive polymer compositions are described in U.S. Pat. No. 4,237,441 (van Konynenburg et al.), U.S. Pat. No. 4,545,926 (Fouts et al.), U.S. Pat. No. 4,774,024 (Deep et al.), U.S. Pat. No. 4,935,156 (van Konynenburg et al.), U.S. Pat. No. 5,049,850 (Evans et al.), U.S. Pat. No. 5,378,407 (Chandler et al.), U.S. Pat. No. 5,451,919 (Chu et al.), U.S. Pat. No. 5,582,770 (Chu et al.), U.S. Pat. No. 5,747,147 (Wartenberg et al.), U.S. Pat. No. 5,801,612 (Chandler et al.), U.S. Pat. No. 6,130,597 (Toth et al.), U.S. Pat. No. 6,358,438 (Isozaki et al.) and U.S. Pat. No. 6,362,721 (Chen et al.). The disclosure of each of these patents is incorporated herein by reference. The first PTC device comprises a first resistive element which is composed of a first conductive polymer composition, while the second PTC device comprises a second resistive element which is composed of a second conductive polymer composition. The switching temperature $T_{s1}$, of the first PTC device is higher than the switching temperature $T_{s2}$ of the second PTC device, so the polymeric component of the first conductive polymer composition generally has a melting temperature which is higher, e.g. at least 10° C. higher, than that of the polymeric component of the second conductive polymer composition.

The first and second PTC devices exhibit positive temperature coefficient (PTC) behavior, i.e., they shows a sharp increase in resistivity with temperature over a relatively small temperature range. The term "PTC" is used to mean a composition or device that has an $R_{14}$ value of at least 2.5 and/or an $R_{100}$ value of at least 10, and it is preferred that the composition or device should have an $R_{30}$ value of at least 6, where $R_{14}$ is the ratio of the resistivities at the end and the beginning of a 14° C. range, $R_{100}$ is the ratio of the resistivities at the end and the beginning of a 100° C. range, and $R_{30}$ is the ratio of the resistivities at the end and the beginning of a 30° C. range. It is preferred that compositions used in the devices of the invention show a PTC anomaly at at least one temperature over the range from 20° C. to $(T_m+5°$ C.) of at least $10^{3.0}$, preferably of at least $10^{3.5}$, particularly of at least $10^{4.0}$, i.e. the log[resistance at $(T_m+5°$ C.)/resistance at 20° C.] is at least 3.0, preferably at least 3.5, particularly at least 4.0. If the maximum resistance is achieved at a temperature $T_x$ that is below $(T_m+5°$ C.), the PTC anomaly is determined by the log(resistance at $T_x$)/resistance at 20° C. It is particularly preferred that the first PTC device have a higher PTC anomaly than the second PTC device.

The PTC resistive element is in physical and electrical contact with at least one electrode that is suitable for connecting the element to a source of electrical power. The type of electrode is dependent on the shape of the element, and may be, for example, solid or stranded wires, metal foils, metal meshes, or metallic ink layers. Particularly useful devices comprise two laminar electrodes, preferably metal foil electrodes, with the conductive polymer resistive element sandwiched between them. The first PTC element is attached to first and second electrodes, while the second PTC element is attached to third and fourth electrodes.

When good adhesion to the PTC element is required, particularly suitable foil electrodes have at least one surface that is microrough, preferably through electrodeposition, e.g. electrodeposited nickel or copper electrodes such as those disclosed in U.S. Pat. No. 4,689,475 (Matthiesen) and U.S. Pat. No. 4,800,253 (Kleiner et al), and in copending, commonly assigned U.S. application Ser. No. 08/816,471 (Chandler et al, filed Mar. 13, 1997), the disclosure of each of which is incorporated herein by reference. The electrodes may be attached to the resistive element by compression-molding, nip-lamination, or any other appropriate technique. However, in one aspect of the invention, it is preferred that the second PTC device have relatively weak adhesion between the second PTC element and at least one of the third and fourth electrodes. For this application, relatively smooth metal foil may be used.

The first PTC device has a resistance at 20° C. $R_1$ which is generally higher, e.g. at least 10% higher and as much as 100% or more higher, than the resistance at 20° C. $R_2$ of the second PTC device. For battery assembly applications, it is preferred that the both the first and second PTC devices have low resistance, i.e. at most 1.0 ohm, preferably at most 0.5 ohm, particularly at most 0.1 ohm, and often less.

The relationship between the hold currents for the first and second PTC devices is important. The first PTC device has a hold current at a first specified temperature $I_{H1}$, and the second PTC device has a hold current at that first specified temperature $I_{H2}$ which is greater than $I_{H1}$. However, due to the thermal derating of the devices, at a critical temperature, $T_{crit}$, which is greater than the first specified temperature $I_{H1}$ equals $I_{H2}$. In operation, at temperatures below $T_{crit}$, if circuit protection arrangement is exposed to an overcurrent or overtemperature condition, the first PTC device will switch into a high resistance state. When the fault is cleared and power to the circuit is removed, the first PTC device will return to a low resistance state, meaning that the circuit protection arrangement is resettable. However, at temperatures greater than $T_{crit}$, if an overcurrent or overtemperature condition occurs, the second PTC device will switch into a high resistance state and initiate an action. The action will cause the circuit protection arrangement to permanently open, and in the case of a battery assembly, will preferably disable the battery pack.

Among the actions which serve to permanently open the circuit protection arrangement are the "blowing" of a thermal fusing element, or the delamination of an electrode from a PTC device. Any appropriate thermal fusing element may be used, e.g. solder or a conductive adhesive which melts and causes an open circuit. It is particularly preferred that the melting temperature of thermal fusing element be greater than that of $T_{s1}$.

The first and second PTC devices may be positioned on the same substrate, e.g. a metal lead which also provides electrical connection or a molded substrate which has appropriate electrical connections applied. Alternatively, the first and second PTC devices may be positioned on or within a housing/substrate.

In another embodiment, the metal leads which are attached to the first and second electrodes of the PTC device may be sufficiently offset so that, in the event of a device failure in which the conductive polymer composition is no longer present, e.g. due to rupture or burning, the metal leads will not come in contact.

The invention is illustrated by the drawings. FIG. 1 is a plot of resistance as a function of temperature for first PTC device 3 and second PTC device 5. As is apparent from the R(T) curve, the resistance of first PTC device 3 is higher than that of second PTC device 5 at most temperatures, but the switching temperature of first PTC device 3, $T_{s1}$, is at a higher temperature than that of second PTC device 5, i.e. $T_{s2}$. Also shown in critical temperature $T_{crit}$, which is the intersection of the R(T) curves of first and second PTC devices.

FIG. 2 is a graphical representation of hold current as a function of temperature for the first and second PTC devices 3,5. At a first specified temperature which is below $T_{crit}$, the $I_H$ value for first PTC device 3 is less than that of second PTC device 5, but the two curves intersect at $T_{crit}$.

FIG. 3 is a circuit diagram incorporating a circuit protection arrangement 1 shown in schematic view in FIG. 4. First PTC device 3 and second PTC device 5 are electrically in series with thermal fusing element 7 and battery 9. Thermal fusing element 7 may be a conductive material, e.g. a solder, having a relatively low melting temperature. First and second PTC devices 3,5 are positioned in a housing 11 which is electrically insulating but which has appropriate conductive traces on it to allow electrical connection between the devices. The housing may be, for example, a molded liquid crystalline polymer or other suitable material. First electrical lead 13 is electrically connected to first PTC device 3, and second electrical lead 15 is electrically connected to second PTC device 5, and these first and second leads are used to make connection to battery 9 or another power source. Current passes sequentially from first lead 13 through first PTC device 3, second PTC device 5, thermal fusing element 7, and then second lead 15. Thermal fusing element 7 may be in direct physical contact with second PTC device 5.

FIG. 5 is a circuit diagram incorporating a circuit protection arrangement 1 shown in schematic view in FIG. 6. In this arrangement, first and second PTC devices 3,5 are positioned on metal substrate 17 which makes electrical connection between the two devices. First lead 13 is connected to first PTC device 3 and second lead 15 is connected to second PTC device 5. In one embodiment of the invention, first PTC device 3 is connected to substrate 17 and first lead 13 by means of solder, while second PTC device 5 is connected to substrate 17 and second lead 15 by means of a weld. Welding, which can be conducted over a very narrow region, may prevent the entire device from being exposed to the elevated temperatures needed to reflow solder.

It will be understood that the above-described arrangements of apparatus and the methods therefrom are merely illustrative of applications of the principles or this invention and many other embodiments and modifications may be made without departing from the spirit and scope of the invention as defined in the claims.

What is claimed is:

1. A circuit protection arrangement which comprises
   (1) a first PTC device which (i) has a first switching temperature $T_{s1}$, (ii) has a resistance at 20° C. $R_1$, (iii) has a hold current at a first specified temperature $I_{H1}$, and (iv) comprises
      (a) a first PTC resistive element composed of a first conductive polymer composition comprising a polymeric component, and, dispersed therein, a particulate conductive filler, and
      (b) first and second electrodes which are attached to the first PTC element; and
   (2) a second PTC device which (i) is electrically connected in series with the first PTC device, (ii) has a second switching temperature $T_{s2}$ which is less than $T_{s1}$, (iii) has a resistance at 20° C. $R_2$ which is less than $R_1$, (iv) has a hold current at the first specified temperature $I_{H2}$ which is greater than $I_{H1}$, and (v) comprises
      (a) a second PTC resistive element composed of a second conductive polymer composition comprising a polymeric component, and, dispersed therein, a particulate conductive filler, and
      (b) third and fourth electrodes which are attached to the second PTC element;

$I_{H1}$ equaling $I_{H2}$ at a critical temperature $T_{crit}$, which is greater than the first specified temperature such that
   (A) at temperatures less than $T_{crit}$, the first PTC device switches into a high resistance state and the circuit protection arrangement is resettable, and
   (B) at temperatures greater than $T_{crit}$, the second PTC device switches into a high resistance state and initiates an action causing the circuit protection arrangement to permanently open.

2. A circuit protection arrangement according to claim 1 wherein the action is the activation of a thermal fusing element electrically in series with the first and second devices.

3. A circuit protection arrangement according to claim 2 wherein the thermal fusing element is a solder or conductive adhesive which melts at a temperature greater than $T_{crit}$.

4. A circuit protection arrangement according to claim 1 wherein the action is the delamination of the third or fourth electrode from the second PTC element.

5. A circuit protection arrangement according to claim 1 wherein the first and second PTC devices are free of thermal linking.

6. A circuit protection arrangement according to claim 1 wherein the first and second PTC devices are physically and electrically connected to a conductive substrate.

7. A circuit protection arrangement according to claim 1 wherein $T_{crit}$ is at least 90° C.

8. A battery assembly which comprises
   (I) a battery; and
   (II) a circuit protection arrangement which comprises
      (1) a first PTC device (i) having a first switching temperature $T_{s1}$, (ii) having a resistance at 20° C. $R_1$, (iii) having a hold current at a first specified temperature $I_{H1}$, and (iv) comprising
  (a) a first PTC resistive element composed of a first conductive polymer composition comprising a polymeric component, and, dispersed therein, a particulate conductive filler, and
  (b) first and second electrodes which are attached to the first PTC element; and
(2) a second PTC device (i) electrically connected in series with the first PTC device, (ii) having a second switching temperature $T_{s2}$ which is less than $T_{s1}$, (iii) having a resistance at 20° C. $R_2$ which is less than $R_1$, (iv) having a hold current at the first specified temperature $I_{H2}$ which is greater than $I_{H1}$, and (v) comprising
  (a) a second PTC resistive element composed of a second conductive polymer composition comprising a polymeric component, and, dispersed therein, a particulate conductive filler, and
  (b) third and fourth electrodes which are attached to the second PTC element;
said first and second PTC devices being in electrical contact with the battery; and
$I_{H1}$ equaling $I_{H2}$ at a critical temperature $T_{crit}$, which is greater than the first specified temperature such that
  (A) at temperatures below $T_{crit}$, the first PTC device switches into a high resistance state and the composite device is resettable, and
  (B) at temperatures greater than $T_{crit}$, the second PTC device switches into a high resistance state and initiates an action causing the composite device to permanently open.

9. An assembly according to claim 8 wherein $T_{crit}$ is at least 90° C.

10. An assembly according to claim 8 wherein the action is the activation of a thermal fusing element electrically in series with the first and second devices.

11. An assembly according to claim 10 wherein the thermal fusing element comprises a solder or conductive adhesive which melts at a temperature greater than $T_{crit}$.

12. An assembly according to claim 11 wherein the thermal fusing element is solder which comprises bismuth.

13. An assembly according to claim 8 wherein the battery comprises a lithium-ion battery or a lithium-polymer battery.

* * * * *